(12) United States Patent
Azizi et al.

(10) Patent No.: US 9,930,659 B2
(45) Date of Patent: Mar. 27, 2018

(54) WIRELESS DEVICE AND METHOD FOR HIGH-EFFICIENCY WI-FI (HEW) COMMUNICATION WITH BLOCK-BY-BLOCK ORTHOGONAL TRAINING SEQUENCES

(71) Applicant: Intel IP Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 176 days.

(21) Appl. No.: 15/023,163

(22) PCT Filed: Dec. 17, 2013

(86) PCT No.: PCT/US2013/075784
§ 371 (c)(1),
(2) Date: Mar. 18, 2016

(87) PCT Pub. No.: WO2015/076857
PCT Pub. Date: May 28, 2015

(65) Prior Publication Data
US 2016/0234049 A1 Aug. 11, 2016

Related U.S. Application Data

(60) Provisional application No. 61/906,059, filed on Nov. 19, 2013.

(51) Int. Cl.
*H04L 27/26* (2006.01)
*H04W 72/04* (2009.01)
(Continued)

(52) U.S. Cl.
CPC ........ *H04W 72/044* (2013.01); *H04B 7/0413* (2013.01); *H04B 7/0452* (2013.01);
(Continued)

(58) Field of Classification Search
CPC ............. H04W 4/008; H04W 72/0413; H04W 72/044; H04W 74/04; H04W 72/0453;
(Continued)

(56) References Cited

U.S. PATENT DOCUMENTS 7,856,068 B1 12/2010 Tung et al.
8,532,213 B2 9/2013 Trachewsky
(Continued)

FOREIGN PATENT DOCUMENTS

CN 105637780 6/2016
WO WO-2015076857 A1 5/2015

OTHER PUBLICATIONS

"International Application Serial No. PCT/US2013/075784, International Preliminary Report on Patentability dated Jun. 2, 2016", 6 pgs.
(Continued)

*Primary Examiner* — Kevin C Harper
*Assistant Examiner* — Henry Baron
(74) *Attorney, Agent, or Firm* — Schwegman Lundberg & Woessner, P.A.

(57) ABSTRACT

Embodiments of a HEW device and method for communicating in a high-efficiency Wi-Fi (HEW) network generally described herein. In some embodiments, an HEW frame may be configured to include an HEW long-training field (HEW-LTF) and the HEW-LTF may include an HEW long-training sequence (HEW-LTS) that is orthogonal on a block-by-block basis to a legacy LTS (L-LTS). The HEW frame may be transmitted as part of a data unit for reception by one or more HEW devices. In some embodiments, an HEW
(Continued)

device and method for packet classification is provided. A packet classification may be determined from the HEW-LTF by determining which of a plurality of HEW-LTSs are included in the HEW-LTF.

26 Claims, 4 Drawing Sheets (51) Int. Cl.
*H04W 4/00* (2018.01)
*H04L 5/00* (2006.01)
*H04B 7/0452* (2017.01)
*H04J 11/00* (2006.01)
*H04L 29/06* (2006.01)
*H04W 24/02* (2009.01)
*H04W 56/00* (2009.01)
*H04W 52/02* (2009.01)
*H04B 7/0413* (2017.01)
*H04W 74/04* (2009.01)
*H04W 84/12* (2009.01)

(52) U.S. Cl.
CPC .............. *H04J 11/00* (2013.01); *H04L 5/005* (2013.01); *H04L 5/0007* (2013.01); *H04L 5/0048* (2013.01); *H04L 5/0053* (2013.01); *H04L 5/0064* (2013.01); *H04L 27/2601* (2013.01); *H04L 27/2602* (2013.01); *H04L 27/2613* (2013.01); *H04L 69/22* (2013.01); *H04W 4/008* (2013.01); *H04W 24/02* (2013.01); *H04W 52/0216* (2013.01); *H04W 52/0219* (2013.01); *H04W 56/002* (2013.01); *H04W 72/0413* (2013.01); *H04W 72/0453* (2013.01); *H04W 74/04* (2013.01); *H04J 2011/0096* (2013.01); *H04L 5/0023* (2013.01); *H04W 84/12* (2013.01); *Y02B 60/50* (2013.01)

(58) Field of Classification Search
CPC ... H04L 5/0064; H04L 5/0007; H04L 5/0048; H04L 27/2602; H04L 27/2613; H04L 5/0052; H04L 27/2601; H04L 69/22; H04B 7/0413; H04J 11/002
See application file for complete search history.

(56) References Cited

U.S. PATENT DOCUMENTS

| | | |
|---|---|---|
| 2006/0182017 A1 | 8/2006 | Hansen et al. |
| 2011/0170627 A1 | 7/2011 | Kwon et al. |
| 2011/0194544 A1 | 8/2011 | Yang et al. |
| 2012/0269124 A1 | 10/2012 | Porat |
| 2013/0121348 A1 | 5/2013 | Zhang et al. |

OTHER PUBLICATIONS

"European Application Serial No. 13897913.3, Extended European Search Report dated Jul. 12, 2017", 8 pgs.
"International Application Serial No. PCT/US2013/075784, International Search Report dated Aug. 25, 2014", 3 pgs.
"International Application Serial No. PCT/US2013/075784, Written Opinion dated Aug. 25, 2014", 4 pgs.

| | L-LTS | HEW-1 | HEW-2 | HEW-3 | HEW-4 | HEW-5 | HEW-6 |
|---|---|---|---|---|---|---|---|
| Block 1 | 1 | 1 | -1 | -1 | -1 | 1 | -1 |
| | 1 | 1 | 1 | -1 | -1 | -1 | -1 |
| | 1 | -1 | -1 | -1 | -1 | -1 | -1 |
| | 1 | -1 | -1 | 1 | 1 | -1 | 1 |
| | -1 | 1 | 1 | -1 | 1 | -1 | 1 |
| | -1 | -1 | 1 | 1 | 1 | 1 | 1 |
| | 1 | 1 | -1 | 1 | 1 | -1 | 1 |
| | 1 | 1 | 1 | -1 | 1 | -1 | -1 |
| | -1 | 1 | 1 | 1 | -1 | -1 | 1 |
| | 1 | 1 | 1 | -1 | -1 | -1 | -1 |
| | -1 | 1 | -1 | -1 | -1 | 1 | -1 |
| | 1 | 1 | 1 | 1 | 1 | 1 | -1 |
| | 1 | -1 | 1 | -1 | 1 | -1 | 1 |
| | 1 | -1 | -1 | -1 | 1 | 1 | 1 |
| | 1 | 1 | 1 | -1 | -1 | 1 | -1 |
| | 1 | 1 | 1 | -1 | 1 | -1 | -1 |
| Block 2 | 1 | -1 | 1 | 1 | 1 | 1 | 1 |
| | -1 | -1 | 1 | -1 | -1 | -1 | 1 |
| | -1 | 1 | 1 | -1 | 1 | 1 | -1 |
| | 1 | 1 | 1 | -1 | -1 | -1 | 1 |
| | 1 | 1 | -1 | -1 | -1 | 1 | -1 |
| | -1 | 1 | 1 | -1 | -1 | -1 | -1 |
| | 1 | -1 | -1 | -1 | -1 | -1 | 1 |
| | -1 | -1 | -1 | 1 | -1 | 1 | -1 |
| | 1 | 1 | 1 | -1 | 1 | -1 | -1 |
| | 1 | 1 | 1 | 1 | 1 | 1 | -1 |
| | 1 | 1 | -1 | 1 | -1 | 1 | -1 |
| | 1 | 1 | -1 | -1 | -1 | 1 | -1 |
| | 1 | 1 | 1 | 1 | 1 | 1 | -1 |
| | 0 | 0 | 0 | 0 | 0 | 0 | 0 |
| Block 3 | 1 | -1 | 1 | 1 | 1 | 1 | 1 |
| | -1 | 1 | 1 | -1 | 1 | 1 | -1 |
| | -1 | -1 | -1 | 1 | 1 | 1 | -1 |
| | 1 | -1 | 1 | 1 | 1 | -1 | -1 |
| | 1 | -1 | 1 | -1 | 1 | 1 | -1 |
| | -1 | -1 | -1 | 1 | 1 | -1 | 1 |
| | 1 | 1 | -1 | -1 | -1 | -1 | 1 |
| | -1 | -1 | -1 | -1 | -1 | -1 | -1 |
| | 1 | 1 | 1 | -1 | 1 | 1 | -1 |
| | -1 | 1 | 1 | 1 | -1 | 1 | -1 |
| | -1 | 1 | 1 | 1 | 1 | 1 | -1 |
| | -1 | -1 | 1 | 1 | 1 | -1 | -1 |

*FIG. 3A*

| | | | | | | |
|---|---|---|---|---|---|---|
| -1 | -1 | -1 | -1 | 1 | -1 | 1 |
| -1 | 1 | -1 | -1 | -1 | -1 | -1 |
| 1 | 1 | -1 | -1 | -1 | -1 | -1 |
| 1 | 1 | -1 | 1 | 1 | -1 | -1 |
| -1 | -1 | 1 | -1 | 1 | 1 | 1 |
| -1 | -1 | 1 | -1 | 1 | -1 | 1 |
| 1 | 1 | 1 | 1 | 1 | 1 | 1 |
| -1 | 1 | -1 | 1 | 1 | 1 | -1 |
| 1 | 1 | -1 | 1 | -1 | 1 | 1 |
| -1 | 1 | 1 | 1 | -1 | -1 | 1 |
| 1 | 1 | 1 | 1 | 1 | -1 | -1 |
| 1 | 1 | 1 | -1 | -1 | 1 | 1 |
| 1 | -1 | -1 | -1 | -1 | 1 | -1 |
| 1 | -1 | 1 | 1 | -1 | -1 | 1 |
| -1 | 1 | -1 | -1 | 1 | 1 | 1 |
| -1 | -1 | 1 | -1 | -1 | 1 | 1 |

312 — BLOCK 4

| 402 | PAPR 404 |
|---|---|
| L-LFT | 3.6919 |
| HEW-1 | 3.5931 |
| HEW-2 | 3.3863 |
| HEW-3 | 3.6825 |
| HEW-4 | 3.6568 |
| HEW-5 | 3.6120 |
| HEW-6 | 3.6918 |

WIRELESS DEVICE AND METHOD FOR HIGH-EFFICIENCY WI-FI (HEW) COMMUNICATION WITH BLOCK-BY-BLOCK ORTHOGONAL TRAINING SEQUENCES

PRIORITY CLAIM

This application is a U.S. National Stage Filing under 35 U.S.C. 371 from International Application No. PCT/US2013/075784 filed Dec. 17, 2013 and published in English as WO 2015/076857 on May 28, 2015, which claims the benefit of priority to U.S. Provisional Patent Application Ser. No. 61/906,059, filed Nov. 19, 2013, each of which is incorporated herein by reference in its entirety.

TECHNICAL FIELD

Embodiments pertain to wireless networks. Some embodiments relate to Wi-Fi networks and networks operating in accordance with one of the IEEE 802.11 standards. Some embodiments relate to high-efficiency wireless or high-efficiency Wi-Fi (HEW) communications. Some embodiments relate to packet classification via preamble detection.

BACKGROUND

Wireless communications has been evolving toward ever increasing data rates (e.g., from IEEE 802.11a/g to IEEE 802.11n to IEEE 802.11 ac). In high-density deployment situations, overall system efficiency may become more important than higher data rates. For example, in high-density hotspot and cellular-offloading scenarios, many devices competing for the wireless medium may have low to moderate data rate requirements (e.g., as compared with the higher data rates achievable in a conventional IEEE 802.11ac network). A recently-formed study group for Wi-Fi evolution referred to as the IEEE 802.11 High Efficiency Wi-Fi (HEW) study group (SG) is addressing these high-density deployment scenarios. One issue is that the frame structure used for conventional and legacy IEEE 802.11 communications including very-high throughput (VHT) communications may be less suitable for such high-density deployment situations. For example, the conventional and legacy frame structure does not provide a way to efficiently signal the particular frame type or packet type.

Thus, there are general needs for devices and methods that improve overall system efficiency in wireless networks, particularly for high-density deployment situations. There are also general needs for devices and methods suitable for HEW communications. There are also general needs for devices and methods suitable for HEW communications that coexist with legacy networks and devices. There are also general needs for devices and methods that provide a more efficient way to signal the particular frame type or packet type.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
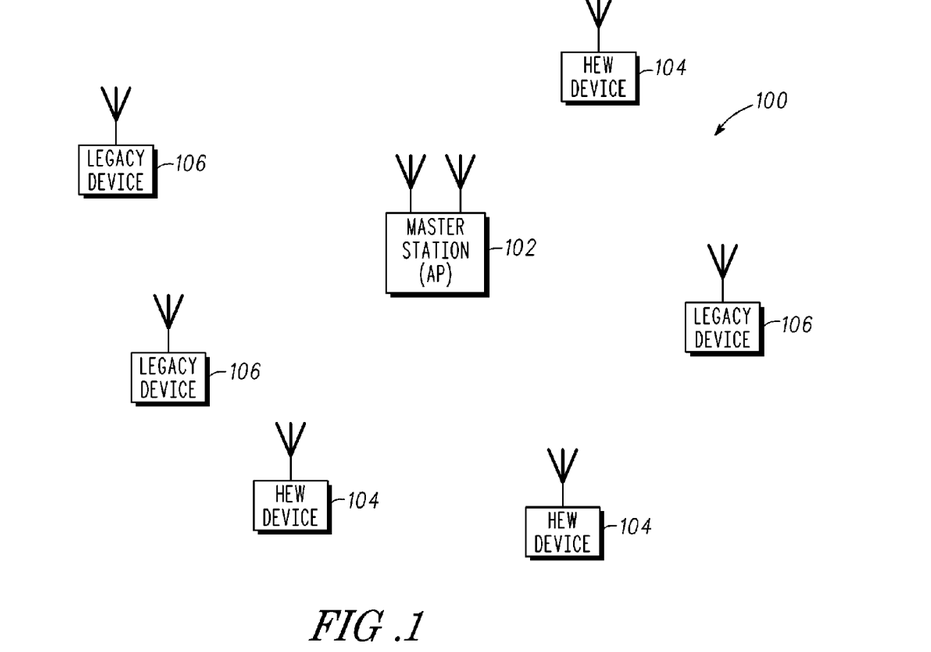
FIG. 1 illustrates a High Efficiency Wi-Fi (HEW) network in accordance with some embodiments.

FIG. 1 illustrates HEW network in accordance with some embodiments. HEW network 100 may include a master station (STA) 102, a plurality of HEW devices 104 (HEW stations), and a plurality of legacy devices 106 (legacy stations). The master station 102 may be arranged to communicate with the HEW devices 104 as well as the legacy devices 106 in accordance with one or more of the IEEE 802.11 standards.

In accordance with embodiments, the master station 102 may include physical layer (PHY) and medium-access control layer (MAC) circuitry which may be arranged to contend for a wireless medium during a contention period to receive exclusive control of the medium for an HEW control period (i.e., a TXOP). The master station may also be arranged to transmit an HEW control and schedule transmission at the beginning of the HEW control period. The HEW control and schedule transmission may include at least a schedule indicating channel resources for communications with at least some of the HEW devices 104 during the HEW control period. During the HEW control period, the HEW devices 104 may communicate with the master station 102 in accordance with a non-contention based multiple access technique using HEW frames. This is unlike conventional Wi-Fi communications in which devices communicate in accordance with a contention-based communication technique, rather than a multiple access technique. In some embodiments, the multiple access technique used during the HEW control period may be an orthogonal frequency division multiple access (OFDMA) technique and the HEW control period may be an HEW OFDMA control period, although this is not a requirement. Although master station 102 is described herein as an access point, the scope of the embodiments is not limited in this respect. Embodiments are application to point-to-point and peer-to-peer (P2P) network operation without a central controller or access point.

The master station 102 may also communicate with legacy devices 106 in accordance with legacy IEEE 802.11 communication techniques. In some embodiments, the master station 102 may also be configurable communicate with the HEW devices 104 outside the HEW control period in accordance with legacy IEEE 802.11 communication techniques, although this is not a requirement.

In accordance with embodiments, an HEW device (e.g., the master station 102 or an HEW device 104) may configure an HEW frame to include an HEW long-training field (HEW-LTF). In these embodiments, the HEW-LTF may include an HEW long-training sequence (HEW-LTS) that is orthogonal on a block-by-block basis to a legacy LTS (L-LTS). The HEW device may transmit the HEW frame as part of a data unit (e.g., a PPDU) for reception by one or more other HEW devices. HEW frames may, for example, be used during the HEW control period.

In these embodiments, each block of the HEW-LTS may be orthogonal with respect to a corresponding block of the L-LTS, however the entire HEW-LTS may not necessarily be orthogonal with the entire L-LTS. The L-LTS may be the training sequence conventionally used for IEEE 802.11 communications within legacy 20 MHz bandwidth channels.

Figure 2:
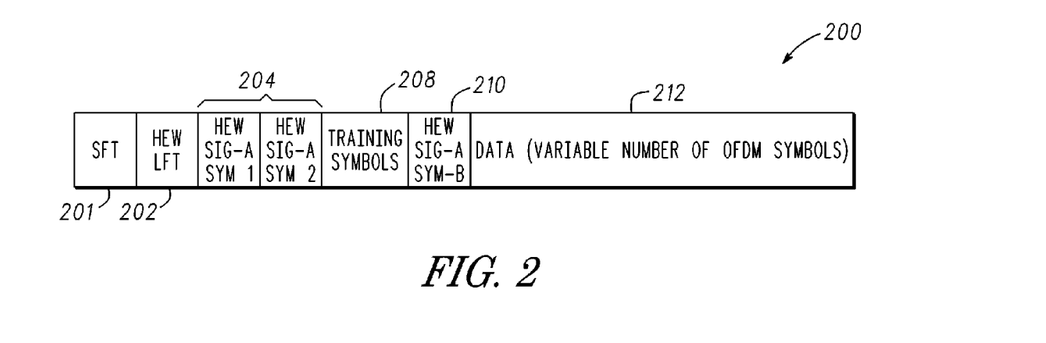
FIG. 2 illustrates an HEW frame in accordance with some embodiments.

FIG. 2 illustrates an HEW frame in accordance with some embodiments. HEW frame 200 may include, among other things, a short-training field (STF) 201, a HEW-LTF 202, and an HEW signal field (HEW SIG-A) 204. HEW frame 200 may also include training symbols 208, another HEW signal field (HEW SIG-B) 210, and a data field 212. In these embodiments, an HEW device, such as the master station 102 or HEW devices 104, may configure the HEW frame 200 to include at least some of these fields. In accordance with embodiments, the HEW-LTF 202 may include an HEW-LTS that is orthogonal on a block-by-block basis to an L-LTS. These embodiments are described in more detail below.

In some embodiments, the HEW SIG-A 204 may comprise two OFDM symbols (e.g., Sym 1 and Sym 2) although this is not a requirement.

The frame structure of HEW frame 200 may be utilized during communications between HEW compliant devices and may result in a reduction in overhead while maintaining coexistence with legacy IEEE 802.11 devices. Accordingly, the frame structure of HEW frame 200 may be suitable for high-density deployment scenarios, including hotspot and cellular offloading scenarios.

Figure 3A:
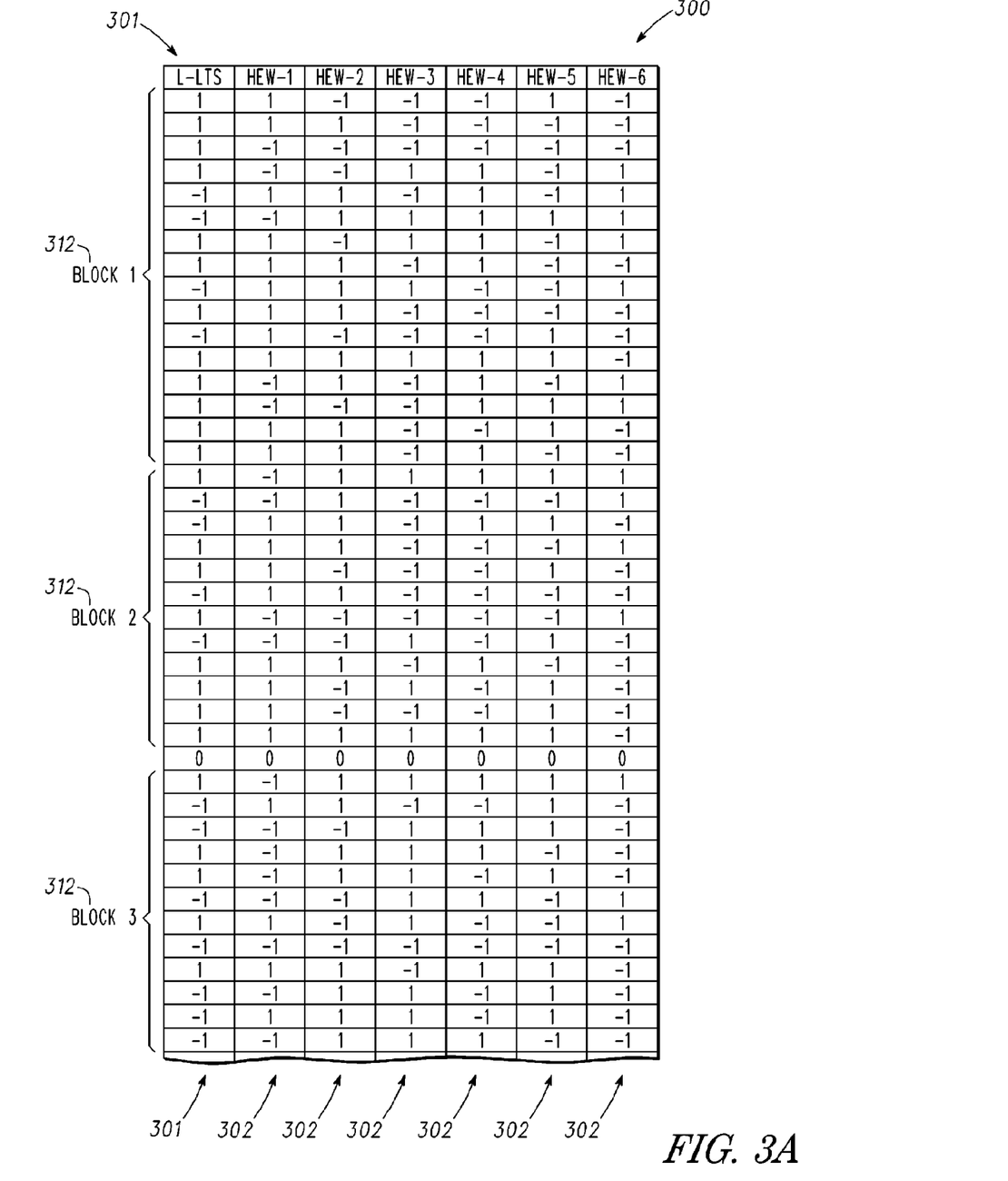
FIGS. 3A and 3B illustrate a table illustrating some example HEW long-training sequences (HEW-LTSs) in accordance with some embodiments.
Figure 3B:
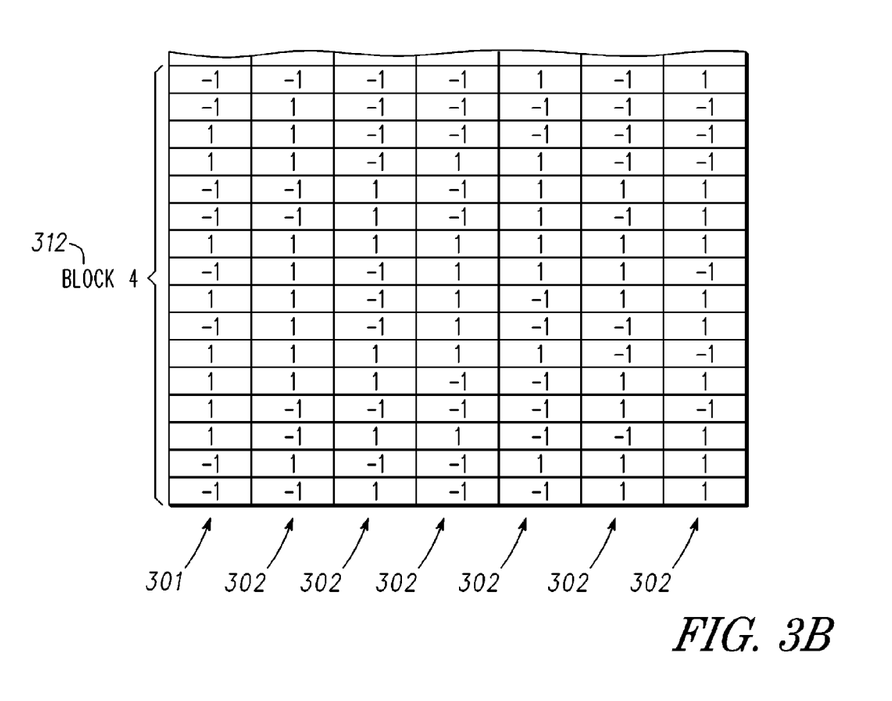

FIGS. 3A and 3B illustrate a table illustrating some example HEW long-training sequences (HEW-LTSs) in accordance with some embodiments. The HEW-LTSs 302 illustrated in table 300 include examples of six different HEW-LTS, labeled as HEW-1, HEW-2, HEW-3, HEW-4, HEW-5 and HEW-6. Table 300 also illustrates an L-LTS 301 for a 20 MHz bandwidth. Any one of the six HEW-LTS 302 illustrated in FIGS. 3A and 3B may be suitable for use as an HEW-LTS for inclusion in HEW-LTF 202 (FIG. 2) of HEW frame 200 (FIG. 2), although other HEW-LTSs may also be suitable.

In accordance with some embodiments, HEW-LTS 302 may include a plurality of blocks 312. In table 300, the HEW-LTSs 302 are illustrated as having four blocks 312, however this not a requirement as an HEW-LTS 302 may include a greater or a lesser number of blocks. In accordance with embodiments, the HEW-LTS 302 included in the HEW-LTF 202 (FIG. 2) may be orthogonal on a block-by-block basis to the L-LTS 301. In these embodiments, each block 312 of the HEW-LTS 302 may be orthogonal with respect to a corresponding block of the L-LTS 301, however the entire HEW-LTS 302 may not necessarily be orthogonal with the entire L-LTS 302. As illustrated in FIGS. 3A and 3B, the L-LTS 301 may be the training sequence conventionally used for IEEE 802.11 communications within 20 MHz bandwidth channels.

In some embodiments (e.g., as illustrated in FIGS. 3A and 3B), each block 312 of the HEW-LTS 302 comprises values associated with a set of adjacent subcarriers. In these embodiments in which each block 312 of the HEW-LTS 302 uses adjacent subcarriers, each block of the HEW-LTS 302 may be also differentially orthogonal with a corresponding block of the L-LTS 301.

In some embodiments (not illustrated), each block of the HEW-LTS comprises values associated with non-adjacent subcarriers. In these embodiments, every $n^{th}$ value of a HEW-LTS 302 may be associated with the same block where N is the number of blocks. For example, if the HEW-LTS comprises four blocks of non-adjacent subcarriers, every fourth value would be associated with the same block (i.e., the first, fifth, ninth . . . values may be associated with the first block, the second, sixth, tenth . . . values may be associated with the second block, etc.).

In accordance with embodiments, the HEW-LTS 302 may be transmitted as part of the HEW-LTF 202 as part of HEW frame 200 over a legacy channel bandwidth. In some embodiments, an HEW channel may comprise two or more legacy channels each having a legacy channel bandwidth. In these embodiments, the HEW frame 200 including the HEW-LTS 302 may be transmitted in each legacy-channel bandwidth as part of the HEW-LTF 202. In some other embodiments, when a plurality of HEW channels is within a single legacy channel bandwidth, the HEW-LTS 302 may be transmitted in the single legacy channel bandwidth.

In some embodiments, the legacy channel bandwidth may be a 20 MHz bandwidth channel. When an HEW channel comprises two or more legacy channels, the HEW channel may comprise channels of 20 MHz bandwidths, 40 MHz bandwidths, 80 MHz bandwidths, and 160 MHz bandwidths. In some embodiments, an HEW channel may comprise a 320 MHz channel. When a plurality of HEW channels is within a single legacy channel bandwidth, an HEW channel may comprise channels of 10 MHz, 5 MHz, 2.5 MHz and 1 MHz bandwidths which reside within a single 20 MHz legacy channel.

Although FIGS. 3A and 3B illustrate several HEW-LTS 302 that are suitable for use for a 20 MHz bandwidth, embodiments described herein are applicable to larger bandwidths. In these embodiments, block-by-block orthogonally may be applied to these higher bandwidth channels to provide higher bandwidth HEW-LTSs. Those skilled in art will be able to generate higher bandwidth HEW-LTSs based on the information disclosed herein.

In some embodiments, an HEW-LTS 302 may be one of a plurality of HEW-LTSs 302 that is orthogonal on a block-by-block basis with the L-LTS 301. In the example illustrated in FIGS. 3A and 3B, each of the six HEW-LTSs 302 that is illustrated may be orthogonal on a block-by-block basis with the L-LTS 301.

In some embodiments, at least some of the HEW-LTSs 302 of the plurality corresponds with a frame type. In these embodiments, packets may be classified by the particular HEW-LTS 302 that is transmitted in the HEW-LTF 202. For example, HEW-1 may indicate a first frame type, HEW-2 may indicate a second frame type, etc. An HEW compliant device 104 may include circuitry to perform a separate correlation for each HEW-LTS 302 to identify the particular HEW-LTS 302 and to determine the frame type.

In some embodiments, the frame types include frames for managed and for unmanaged networks. For example, managed networks may be networks provided by service providers (e.g., AT&T, Verizon, etc.), while unmanaged networks may be networks provided by individuals (e.g., an individual's access point) or non-service providers. In these embodiments, HEW frames 200 transmitted by managed networks may use one or more predetermined HEW-LTSs 302, while HEW frames 200 transmitted by unmanaged networks may use different HEW-LTSs 302. An HEW compliant device 104 may be pre-programmed with this information to determine whether the network from which an HEW frame 200 is received is from a managed or an unmanaged network.

In some embodiments, the particular HEW-LTS 302 may indicate to an HEW device 104 whether or not the HEW frame 200 is intended for the HEW device 104. When the HEW frame 200 is not intended for an HEW device 104, the HEW device may not need to decode any further fields of the HEW frame 200. In some embodiments, at least some of the HEW-LTSs 302 may indicate to an HEW device 104 a classification of the data unit.

In some embodiments, at least some of the HEW-LTSs 302 may indicate to an HEW device 104 how to interpret one or more of the subsequent fields (e.g., the HEW signal fields) in the packet (e.g., the HEW SIG-A 204 and/or the HEW SIG-B 210). In some of these embodiments, a particular HEW-LTS 302 may be used to indicate that a higher-level modulation and coding scheme (MCS) is used for the data field, that the packet is a shorter packet transmitted over a wider bandwidth, or that a longer packet transmitted over a narrower bandwidth. In an example where a particular HEW-LTS 302 is used to indicate that a higher-level MCS is used for the data field, the MCS may be removed or not included in the signal field.

In the examples illustrated in FIGS. 3A and 3B, each HEW-LTS 302 may include 64 values. The value of zero corresponds to the DC subcarrier 314 in which no value of the sequence is actually transmitted. In the examples illustrated in FIGS. 3A and 3B, twenty-eight values may be provided on each side of the DC subcarrier 314 for a total of fifty-six values. Values of zero for a guard interval are not illustrated resulting in a sequence of sixty-four values corresponding to sixty-four subcarriers, which may be suitable for a 20 MHz channel bandwidth.

In some embodiments, the HEW-LTS 302 may be selected from one of a plurality of candidate HEW sequences to minimize a calculated peak-to-average power ratio (PAPR). In some embodiments, the HEW-LTS 302 may be selected from one of the plurality of candidate HEW sequences based further on a randomness criterion. In some embodiments, the HEW-LTS 302 may be selected from one of the plurality of candidate sequences to maximize an autocorrelation speed. These embodiments are described in more detail below.

Figure 4:
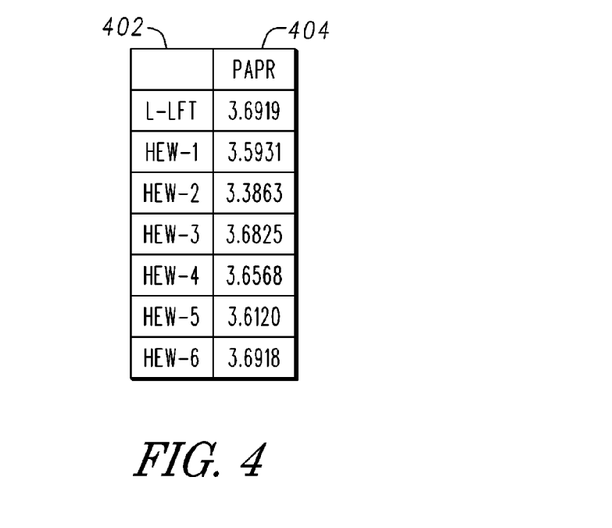
FIG. 4 is a table illustrating the peak-to-average power ratio (PAPR) of the HEW-LTSs of FIGS. 3A and 3B in accordance with some embodiments.

FIG. 4 is a table illustrating the PAPR of the HEW-LTSs of FIGS. 3A and 3B in accordance with some embodiments. In these embodiments, the HEW-LTSs 302 (FIGS. 3A and 3B) may be selected from one of a plurality of candidate HEW sequences to minimize a calculated PAPR.

As mentioned above, in some embodiments, the HEW-LTS 302 may be selected from one of the plurality of candidate HEW sequences based further on a randomness criterion. The randomness criterion may be based on a number of consecutive values of the sequence being the same (e.g., either −1 or +1). In some embodiments, the number of consecutive values of the HEW-LTS 302 being −1 or being +1 may be no greater than six. In some embodiments, the number of consecutive values of the HEW-LTS 302 being −1 or being +1 may be no greater than five, although the scope of the embodiments is not limited in this respect.

In some embodiments, for an N-bit length L-LTS 301, the HEW-LTS 302 comprises M blocks in which N/M is a block length, wherein any of the M blocks are orthogonal with respect to a corresponding block of the L-LTS 301, and wherein N>M and N, M and N/M are whole numbers. In these embodiments, N may be 64, although other length sequences (e.g., 128, 256) may also be used. In these embodiments, M may be 2, 4, 8 or 16, for example. For example, for a 64-bit length legacy sequence (N=64) and for an HEW-LTS 302 that comprises four blocks (M=4), each block of the HEW-LTS would comprise a 16-bit length sequence. In these embodiments, each 16 bit sequence is orthogonal to the corresponding 16-bit block of the L-LTS 301.

In some embodiments, the HEW-LTS 302 may comprises one of the following six sequences, exclusive of guard interval values:

HEW-1: (1, 1, −1, −1, 1, −1, 1, 1, 1, 1, 1, 1, −1, −1, 1, 1, −1, −1, 1, 1, 1, 1, −1, −1, 1, 1, 1, 1, 0, −1, 1, −1, −1, −1, −1, 1, −1, 1, −1, 1, −1, −1, 1, 1, 1, −1, −1, 1, 1, 1, 1, 1, 1, −1, −1, 1, −1);

HEW-2: (−1, 1, −1, −1, 1, 1, −1, 1, 1, 1, −1, 1, 1, −1, 1, 1, 1, 1, 1, −1, 1, −1, −1, 1, −1, −1, 1, 0, 1, 1, −1, 1, 1, −1, −1, −1, 1, 1, 1, 1, −1, −1, −1, −1, 1, 1, 1, −1, −1, −1, 1, 1, −1, 1, −1, 1);

HEW-3: (−1, −1, −1, 1, −1, 1, 1, −1, 1, −1, −1, 1, −1, −1, −1, −1, 1, −1, −1, −1, −1, −1, −1, 1, −1, 1, −1, 1, 0, 1, −1, 1, 1, 1, 1, 1, −1, −1, 1, 1, 1, −1, −1, −1, 1, −1, −1, 1, 1, 1, 1, 1, −1, −1, 1, −1, −1)

HEW-4: (−1, −1, −1, 1, 1, 1, 1, 1, 1, −1, −1, −1, 1, 1, −1, 1, 1, −1, 1, −1, −1, −1, −1, −1, 1, −1, −1, 1, 0, 1, −1, 1, 1, −1, 1, −1, −1, 1, −1, −1, 1, 1, −1, −1, 1, 1, 1, 1, 1, −1, −1, 1, −1, −1, −1, 1, −1);

HEW-5: (1, −1, −1, −1, −1, 1, −1, −1, −1, −1, 1, 1, −1, 1, 1, −1, 1, −1, 1, −1, 1, −1, −1, 1, −1, 1, 1, 1, 0, 1, 1, 1, −1, 1, −1, −1, −1, 1, 1, 1, −1, −1, −1, −1, −1, 1, −1, 1, 1, 1, −1, −1, 1, 1, −1, 1, 1); and HEW-6: (−1, −1, −1, 1, 1, 1, 1, −1, 1, 1, −1, −1, −1, 1, 1, −1, −1, 1, 1, −1, 1, −1, −1, 1, −1, −1, −1, −1, −1, 0, 1, −1, −1, −1, −1, 1, 1, −1, −1, −1, −1, 1, −1, −1, −1, 1, 1, 1, −1, 1, 1, −1, 1, −1, 1, 1, 1)

As illustrated in FIGS. 3A and 3B, the LTS-301 may comprise: L-LTF: (1, 1, 1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, −1, −1).

In some embodiments, an HEW compliant device, such as master station 102 or HEW device 104, may be arranged to perform packet classification. In these embodiments, the HEW compliant device, such as HEW device 104, may receive an HEW frame 200 from an HEW master station 102 (e.g., an HEW compliant AP). The HEW frame 200 may include an HEW-LTF 202 and an HEW SIG-A 204 following the HEW-LTF 202. The HEW device 102 may determine a packet classification from the HEW-LTF 202 by determining which of a plurality of HEW-LTSs 302 are included in the HEW-LTF 202. In some embodiments, a look-up-table may be used to determine the packet classification.

In some embodiments, in response to determining the packet classification, the HEW device 104 may refrain from decoding the HEW SIG 204 when the packet classification indicates that the packet is not intended for the HEW station 104 and may decode the HEW SIG 204 when the packet classification indicates that the packet is intended for the HEW station 104. In some embodiments, the HEW device 104 may access a look-up table stored in memory to determine the packet classification from the identified HEW-LTS 302.

In some embodiments, the HEW device 104 may perform a separate correlation for each HEW-LTS 302 to identify the particular HEW-LTS 302 that is included in the HEW frame 200 prior to determining the packet classification. In some embodiments, HEW frame 200 may also include a STF 201, although this is not a requirement. In these embodiments, prior to performing a correlation to identify the HEW-LTS 302, the receiver may first perform a correlation to identify the STS to identify the STF 201 and thus determine when to begin looking for the HEW-LTF 202.

Figure 5:
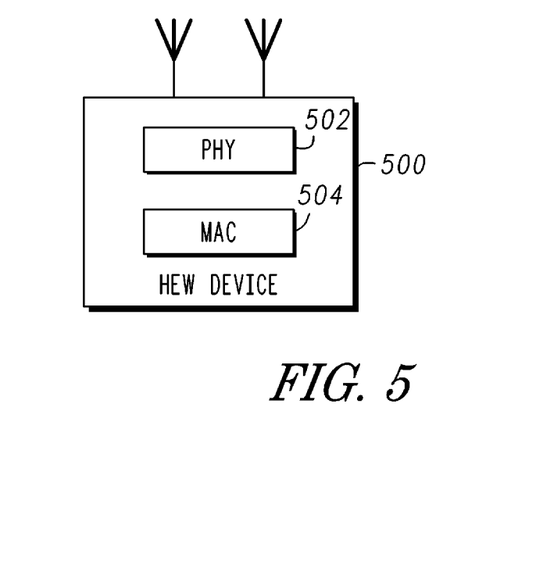
FIG. 5 illustrates an HEW compliant device in accordance with some embodiments.

FIG. 5 illustrates an HEW compliant device in accordance with some embodiments. HEW device 500 may be an HEW compliant device that may be arranged to communicate with one or more other HEW devices, such as HEW devices as well as communicate with legacy devices. HEW device 500 may be suitable for operating as a master station 102 (FIG. 1) or an HEW device 104 (FIG. 1). In accordance with embodiments, HEW device 500 may include, among other things, physical layer (PHY) 502 and medium-access control layer (MAC) 504. PHY 502 and MAC 504 may be HEW compliant layers and may also be compliant with one or more legacy IEEE 802.11 standards. PHY 502 may be arranged to transmit HEW frames, such as HEW frame 200 (FIG. 2), which may include an HEW-LTS 302 (FIGS. 3A and 3B) as part of HEW-LTF 202 (FIG. 2). In some embodiments, PHY 502 may include one or more correlators or suitable correlation circuitry to perform a correlation to identify the particular HEW-LTS 302 (FIGS. 3A and 3B) in a received packet.

In accordance with some embodiments, the MAC 504 may be arranged to contend for a wireless medium during a contention period to receive control of the medium for an HEW control period and the PHY 102 may be arranged to transmit an HEW master-sync transmission at the beginning of the HEW control period. When operating as a master station 102 (FIG. 1), HEW device 500 may allocate resources to HEW devices 104 (FIG. 1) for use during the HEW control period.

In some embodiments, the HEW device 500 may be configured to communicate using OFDM communication signals over a multicarrier communication channel. In some embodiments, HEW device 500 may be configured to receive signals in accordance with specific communication standards, such as the Institute of Electrical and Electronics Engineers (IEEE) standards including IEEE 802.11-2012 and/or 802.11n-2009 standards and/or proposed specifications for WLANs including proposed HEW standards, although the scope of the invention is not limited in this respect as they may also be suitable to transmit and/or receive communications in accordance with other techniques and standards. In some other embodiments, HEW device 500 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 500 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW device 500 may include one or more of a keyboard, a display, a non-volatile memory port, multiple antennas, a graphics processor, an application processor, speakers, and other mobile device elements. The display may be an liquid crystal display (LCD) screen including a touch screen The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although HEW device 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 500 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 6:
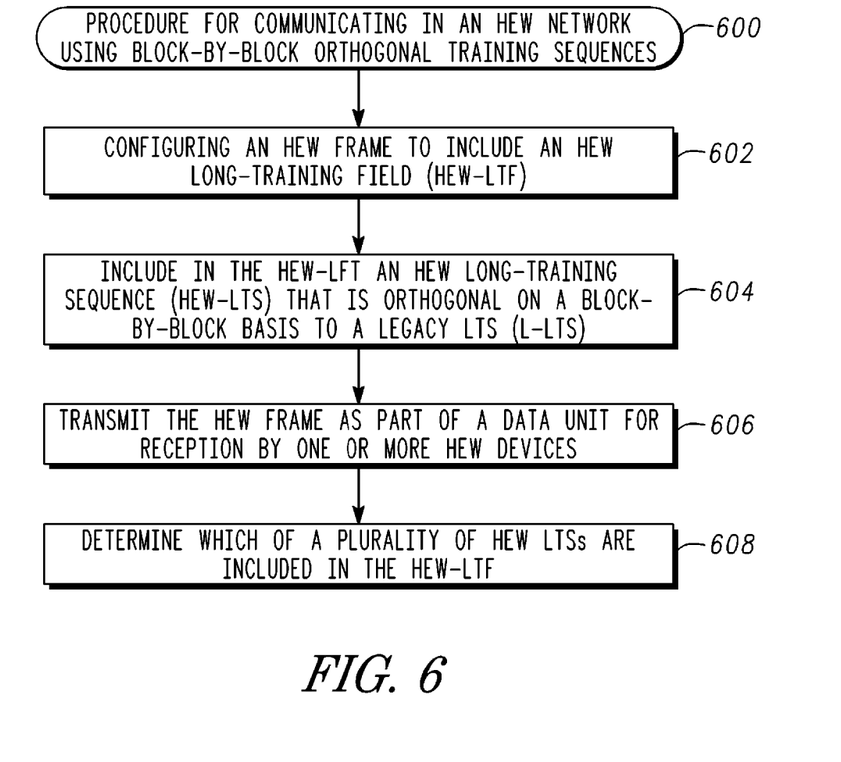
FIG. 6 is a procedure for communicating in an HEW network using block-by-block orthogonal training sequences in accordance with some embodiments.

FIG. 6 is a procedure for communicating in an HEW network using block-by-block orthogonal training sequences in accordance with some embodiments. Procedure 600 may be performed an HEW compliant device, such as HEW device 500 (FIG. 1), although other devices may be configured to perform procedure 600.

Operation 602 may include configuring an HEW frame, such as HEW frame 200 (FIG. 2), to include an HEW-LTF, such as HEW-LTF 202 (FIG. 2).

Operation 604 may comprise including an HEW-LTS, such as one of HEW-LTSs 302 (FIGS. 3A and 3B), in the HEW-LTF 202. The HEW-LTS may be orthogonal on a block-by-block basis to an L-LTS, such as L-LTS 301.

Operation 606 may comprise transmitting the HEW frame 200 as part of a data unit for reception by one or more HEW devices, such as one of HEW devices 104 (FIG. 1). In these embodiments, each block 312 (FIGS. 3A and 3B) of the HEW-LTS 302 may be orthogonal with respect to a corresponding block of the L-LTS 301.

Operation 608 may comprise determining a packet classification from the HEW-LTF by determining which of a plurality of HEW LTSs are included in the HEW-LTF. Based on the packet classification, the device may be arranged to perform certain operations (e.g., decode other fields in the frame) or refrain from performing certain operations.

The legacy training sequences of conventional packets in accordance with IEEE 802.11 ac for 20 MHz channels are identical. The same preamble is sent every time irrespective of which devices are communicating and when they last communicated with each other. Enabling packet classification via orthogonal training sequences in high density scenarios in accordance with the embodiments disclosed herein may enable many devices to classify incoming packets quickly from the header without wasting battery power to further decode the signal field. Packet classification via preamble can be used in signaling variety of information to the receiver such as higher Modulation Coding Scheme (MCS) vs. lower MCS, HEW vs. legacy packet, a particular packet format (e.g. single user vs. multi-user MIMO), a particular packet type (e.g., HEW ACK packet) and etc.

Some embodiments disclosed herein provide an HEW-LTS 302 that is orthogonal to L-LTS 301 and that can be utilized as a method of signaling information. This greatly reduces the overhead of encoding and decoding many bits of information in a SIG field of HEW packets.

Classifying packets quickly (i.e., based on the preamble) can improve scheduling purposes, can shorten the length of signal field and hence can improve overall efficiency. These embodiments provide efficiency gains without degradation to the system from that of IEEE 802.11a/n/ac.

In some embodiments, the HEW-LTS 302 is orthogonal to the L-LTS 302 to allow HEW vs. legacy mode classification. In some embodiments, a block-by-block differentially orthogonal HEW LTS design may provide complete orthogonality with 20/40/80 and 160 MHz LTS's while meeting other design requirements such as low PAPR.

For a transmitted binary preamble sequence P, and R; the received preamble symbol P after being passed through a channel H, and undergoing a N-point FFT operation, has a frequency domain differential detector defined as:

$$DD(R, P) = \sum_{k=1}^{N-1} (r_k r_{k+1}^*).(p_k p_{k+1}^*)^*$$

$$= \sum_{k=1}^{N-1} [(p_k h_k + n_k)(p_{k+1}^* h_{k+1}^* + n_{k+1}^*)].(p_k p_{k+1}^*)^*$$

$$\approx \sum_{k=1}^{N-1} h_k h_{k+1}^* \approx \sum_{k=1}^{N-1} |h_k|^2$$

Note that for a binary sequence $p_k p_{k+1}^* = \pm 1$. DD (R,P) indicates if symbol R includes sequence P, allowing classification of the transmitted preamble P from another preamble sequence, by examining $$\arg\max_P \{DD(R, P)\}$$

In some embodiments, the block-by-block differential detector is provided where the sequence of length N is divided into four blocks of size $A_1$, $A_2$, $A_3$, $A_4$ (or $A_1$, $A_2$ ..., $A_L$ as a generalization). The detection metric is the sum of $$BDD(R, P) = \sum_l DD(R_l, A_l)$$

over the blocks $A_1$, $A_2$, $A_3$, $A_4$ and their corresponding received blocks $R_1$, $R_2$, $R_3$, $R_4$.

In the classification problem, the transmitted preamble P is distinguished from another preamble Q if it maximizes the new block-wise metric $$\arg\max_P \{BDD(R, P)\}$$

assuming that $$\sum_{k \in A_1} (p_k p_{k+1}^*).(q_k q_{k+1}^*)^* = 0$$

Regarding the structure of the sequence in frequency domain, note that while a 64-length sequence is explained in below, the inventive concept may be applied to other FFT sizes and channel bandwidths. The sequence (reading from left to right) may be designed as follows:

It is 64 in length: 4 zeros (guard tones), 28 arbitrary valued, 1 zero (for DC subcarrier), 28 arbitrary valued, 3 zeros (guard tones).

Frequency Domain OFDM Symbol Structure:

The 4 left most subcarriers are nulled (sub-carriers 0-3 denoted by $a_{0,1}$, $a_{1,1}$, $a_{2,1}$, $a_{3,1}$).

Block $A_1$: This block consists of 11 subcarriers 4-14 containing frequency domain signals $a_{4,1}$, $a_{5,1}$, ..., $a_{13,1}$, $a_{14,1}$ respectively.

Block $A_2$: This block consists of 17 subcarriers 15-31 containing frequency domain signals $a_{15,2}$, $a_{16,2}$, ..., $a_{30,2}$, $a_{31,2}$, respectively.

Block $A_2$ is followed by DC subcarrier (subcarriers 32).

Block $A_3$: This block consists of 15 subcarriers 33-47 containing frequency domain signals $a_{15,3}$, $a_{16,3}$, ..., $a_{46,3}$, $a_{47,3}$ respectively.

Block $A_4$: This block consists of 13 subcarriers 48-60 containing frequency domain signals $a_{48,4}$, $a_{49,4}$, ..., $a_{59,4}$, $a_{60,4}$ respectively.

The 3 rightmost subcarriers are nulled.

Construction of a Blocks:

Blocks $A_1$, $A_2$, $A_3$, $A_4$ are populated using a computer search program that chooses a value from $\{-1,1\}$ with the following objectives:

Orthogonality to L-LTS as explained in the above. Table 300 (FIGS. 3A and 3B) lists some sequences that also meet other objectives listed below.

Control the PAPR of the overall sequence aiming to be almost 3.7 dB to be comparable to the PAPR of the legacy sequence that is 3.7 dB (and similarly comparable to the legacy PAPR of 128/256/512 FFT sizes for other bandwidths).

Randomness: to make the preamble sequences look random by not allowing more than six consecutive values to be either 1 or −1. The HEW-LTS in table 300 meet these criteria.

Maximize autocorrelation speed (e.g., the slope of the autocorrelation may be maximized): the speed of autocorrelation may drop at a faster rate after the STF. Once autocorrelation passes 16 samples (equivalent to the length of one short training sequences), the rate of autocorrelation drops.

Additional notes on the advantage of the proposed method:

Scanning double hypotheses P, and Q (or multiple hypotheses as a generalization) does not increase the number of multiplications (only additions). It can be easily shown that if wireless channel is flat over each block, then the block-wise orthogonality is preserved. Hence, the block-wise orthogonality is expected to outperform orthogonality over the entire sequence.

In an example, a method for communication in a high-efficiency Wi-Fi (HEW) network is provided. The method comprises configuring an HEW frame to include an HEW long-training field (HEW-LTF), the HEW-LTF to include an HEW long-training sequence (HEW-LTS) that is orthogonal on a block-by-block basis to a legacy LTS (L-LTS), and transmitting the HEW frame as part of a data unit for reception by one or more HEW devices.

In another example, the HEW-LTS comprises a plurality of blocks, each block being orthogonal with a corresponding block of the L-LTS.

In another example, each block of the HEW-LTS comprises values associated with a set of adjacent subcarriers.

In another example, each block of the HEW-LTS comprises values associated with non-adjacent subcarriers.

In another example, transmitting the HEW frame comprises transmitting the HEW-LTS as part of the HEW-LTF over a legacy channel bandwidth.

In another example, when an HEW channel comprises two or more legacy channels each having a legacy channel bandwidth, transmitting the HEW frame comprises transmitting the HEW-LTS in each legacy-channel bandwidth as part of the HEW-LTF, and wherein when a plurality of HEW channels are within a single legacy channel bandwidth, transmitting the HEW frame comprises transmitting the HEW-LTS in the single legacy channel bandwidth.

In another example, the HEW-LTS is one of a plurality of HEW-LTSs, each being orthogonal on a block-by-block basis with the L-LTS.

In another example, at least some of the HEW-LTSs of the plurality corresponds with a frame type.

In another example, the frame types include frames for managed and for unmanaged networks.

In another example, the method further comprises configuring the HEW frame to include a HEW signal field, and at least some of the HEW-LTSs indicate to an HEW device a classification of the data unit including how to interpret the HEW signal field.

In another example, the HEW-LTS is selected from one of a plurality of candidate HEW sequences to minimize a calculated peak-to-average power ratio (PAPR).

In another example, the HEW-LTS is further selected from one of the plurality of candidate HEW sequences based further on a randomness criterion, the randomness criterion being a number of consecutive values being the same.

In another example, the HEW-LTS is further selected from one of the plurality of candidate sequences to maximize an autocorrelation speed.

In another example, the HEW-LTS comprises one of the following sequences:

HEW-1: (1, 1, −1, −1, 1, −1, 1, 1, 1, 1, 1, 1, −1, −1, 1, 1, −1, −1, 1, 1, 1, 1, −1, −1, 1, 1, 1, 1, 0, −1, 1, −1, −1, −1, −1, −1, 1, −1, 1, −1, 1, −1, −1, 1, 1, 1, −1, −1, 1, 1, 1, 1, 1, 1, −1, −1, 1, −1),

HEW-2: (−1, 1, −1, −1, 1, 1, −1, 1, 1, 1, −1, 1, 1, −1, 1, 1, 1, 1, 1, −1, 1, −1, −1, 1, −1, −1, 1, 0, 1, 1, −1, 1, 1, −1, −1, −1, 1, 1, 1, 1, −1, −1, −1, −1, 1, 1, 1, −1, −1, −1, 1, 1, −1, 1, −1, 1),

HEW-3: (−1, −1, −1, 1, −1, 1, 1, −1, 1, −1, −1, 1, −1, −1, −1, −1, 1, −1, −1, −1, −1, −1, −1, 1, −1, 1, −1, 1, 0, 1, −1, 1, 1, 1, 1, 1, −1, −1, 1, 1, 1, −1, −1, −1, 1, −1, −1, 1, 1, 1, 1, 1, −1, −1, 1, −1, −1)

HEW-4: (−1, −1, −1, 1, 1, 1, 1, 1, −1, −1, −1, 1, 1, 1, −1, 1, 1, −1, 1, −1, −1, −1, −1, −1, 1, −1, −1, 1, 0, 1, −1, 1, 1, −1, 1, −1, −1, 1, −1, −1, 1, 1, −1, −1, 1, 1, 1, 1, 1, 1, −1, −1, 1, −1, −1, −1, 1, −1),

HEW-5: (1, −1, −1, −1, −1, 1, −1, −1, −1, −1, 1, 1, −1, 1, 1, −1, 1, −1, 1, −1, −1, 1, −1, 1, 1, 1, 0, 1, 1, 1, −1, 1, −1, −1, −1, 1, 1, 1, −1, −1, −1, −1, −1, 1, −1, 1, 1, 1, −1, −1, 1, 1, −1, 1, 1), and HEW-6: (−1, −1, −1, 1, 1, 1, 1, −1, 1, −1, −1, −1, 1, 1, −1, −1, 1, 1, −1, 1, −1, −1, 1, −1, −1, −1, −1, −1, 0, 1, −1, −1, −1, −1, 1, 1, −1, −1, −1, −1, −1, 1, −1, −1, −1, 1, 1, 1, −1, 1, 1, −1, 1, −1, 1, 1, 1).

In another example, a wireless device configured for high-efficiency Wi-Fi (HEW) communication is provided. The device comprises physical layer (PHY) and medium-access control layer (MAC) circuitry configured to: configure an HEW frame to include an HEW long-training field (HEW-LTF), the HEW-LTF to include an HEW long-training sequence (HEW-LTS) that is orthogonal on a block-by-block basis to a legacy LTS (L-LTS), and transmit the HEW frame as part of a data unit for reception by one or more HEW devices.

In another example, the HEW-LTS comprises a plurality of blocks, each block being orthogonal with a corresponding block of the L-LTS.

In another example, the wireless device further comprises processing circuitry to determine a packet classification from the HEW-LTF by determining which of a plurality of HEW long-training sequences (LTSs) are included in the HEW-LTF.

In another example, a method for packet classification performed by a high-efficiency Wi-Fi (HEW) device is provided. The method comprises receiving an HEW frame from an HEW master station, the HEW frame including an HEW long-training field (LTF) and an HEW signal field (HEW-SIG) following the HEW-LTF, determining a packet classification from the HEW-LTF by determining which of a plurality of HEW long-training sequences (LTSs) are included in the HEW-LTF, and performing an operation based on the determined packet classification. The HEW-LTS comprises a plurality of blocks, each block being orthogonal with a corresponding block of a legacy LTS (L-LTS).

In another example, in response to determining the packet classification, the method includes: refraining from decoding the HEW SIG when the packet classification indicates that the packet is not intended for the HEW station, and decoding the HEW SIG when the packet classification indicates that the packet is intended for the HEW station.

In another example, the method further comprises performing a separate correlation for each HEW-LTS to identify the particular HEW-LTS that is included in the HEW frame prior to determining the packet classification.

In another example, the method further comprises accessing a look-up table based on the identified HEW-LTS to determine the packet classification.

The Abstract is provided to comply with 37 C.F.R. Section 1.72(b) requiring an abstract that will allow the reader to ascertain the nature and gist of the technical

What is claimed is:

1. A method for communication in a high-efficiency Wi-Fi (HEW) network, the method comprising:
  configuring an HEW frame to include an HEW long-training field (HEW-LTF), the HEW-LTF to include an HEW long-training sequence (HEW-LTS) that is orthogonal on a block-by-block basis to a legacy LTS (L-LTS); and
  transmitting the HEW frame as part of a data unit for reception by one or more HEW devices.

2. The method of claim 1 wherein the HEW-LTS comprises a plurality of blocks, each block being orthogonal with a corresponding block of the L-LTS.

3. The method of claim 2 wherein each block of the HEW-LTS comprises values associated with a set of adjacent subcarriers, and
  wherein each block of values associated with the adjacent subcarriers are differentially orthogonal with a corresponding block of the L-LTS.

4. The method of claim 2 wherein each block of the HEW-LTS comprises values associated with non-adjacent subcarriers.

5. The method of claim 2 wherein transmitting the HEW frame comprises transmitting the HEW-LTS as part of the HEW-LTF over a legacy channel bandwidth.

6. The method of claim 2 wherein when an HEW channel comprises two or more legacy channels each having a legacy channel bandwidth, transmitting the HEW frame comprises transmitting the HEW-LTS in each legacy-channel bandwidth as part of the HEW-LTF, and
  wherein when a plurality of HEW channels are within a single legacy channel bandwidth, transmitting the HEW frame comprises transmitting the HEW-LTS in the single legacy channel bandwidth.

7. The method of claim 6 wherein the HEW-LTS is one of a plurality of HEW-LTSs, each being orthogonal on a block-by-block basis with the L-LTS.

8. The method of claim 7 wherein at least some of the HEW-LTSs of the plurality corresponds with a frame type.

9. The method of claim 8 wherein the frame types include frames for managed and for unmanaged networks.

10. The method of claim 7 further comprising configuring the HEW frame to include a HEW signal field,
  wherein at least some of the HEW-LTSs indicate to an HEW device a classification of the data unit including how to interpret the HEW signal field.

11. The method of claim 2 wherein the HEW-LTS is selected from one of a plurality of candidate HEW sequences to minimize a calculated peak-to-average power ratio (PAPR).

12. The method of claim 11 wherein the HEW-LTS is further selected from one of the plurality of candidate HEW sequences based further on a randomness criterion, the randomness criterion being a number of consecutive values being the same.

13. The method of claim 12 wherein the HEW-LTS is further selected from one of the plurality of candidate sequences to maximize an autocorrelation speed.

14. The method of claim 2 wherein the HEW-LTS comprises one of the following sequences:

HEW-1: (1, 1, −1, −1, 1, −1, 1, 1, 1, 1, 1, 1, −1, −1, 1, 1, −1, −1, 1, 1, 1, 1, −1, −1, 1, 1, 1, 1, 0, −1, 1, −1, −1, −1, −1, 1, −1, 1, −1, 1, −1, −1, 1, 1, 1, −1, −1, 1, 1, 1, 1, 1, −1, −1, 1, −1);

HEW-2: (−1, 1, −1, −1, 1, 1, −1, 1, 1, 1, −1, 1, 1, −1, 1, 1, 1, 1, 1, −1, 1, −1, −1, 1, −1, −1, 1, 0, 1, 1, −1, 1, 1, −1, −1, −1, 1, 1, 1, 1, −1, −1, −1, −1, 1, 1, 1, −1, −1, −1, 1, 1, −1, 1, −1, 1);

HEW-3: (−1, −1, −1, 1, −1, 1, 1, −1, 1, −1, −1, 1, −1, −1, −1, −1, 1, −1, −1, −1, −1, −1, −1, 1, −1, 1, −1, 1, 0, 1, −1, 1, 1, 1, 1, 1, −1, −1, 1, 1, 1, −1, −1, −1, 1, −1, −1, 1, 1, 1, 1, 1, −1, −1, 1, −1, −1)

HEW-4: (−1, −1, −1, 1, 1, 1, 1, 1, −1, −1, −1, 1, 1, 1, −1, 1, 1, −1, 1, −1, −1, −1, −1, −1, 1, −1, −1, 1, 0, 1, −1, 1, 1, −1, 1, −1, −1, 1, −1, −1, 1, 1, −1, −1, 1, 1, 1, 1, 1, −1, −1, 1, −1, −1, −1, 1, −1);

HEW-5: (1, −1, −1, −1, −1, 1, −1, −1, −1, −1, 1, 1, −1, 1, 1, −1, 1, −1, 1, −1, 1, −1, −1, 1, −1, 1, 1, 1, 0, 1, 1, 1, −1, 1, −1, −1, −1, 1, 1, 1, −1, −1, −1, −1, −1, 1, −1, 1, 1, 1, −1, −1, 1, 1, −1, 1, 1); and HEW-6: (−1, −1, −1, 1, 1, 1, 1, −1, 1, −1, −1, −1, 1, 1, −1, −1, 1, 1, −1, 1, −1, −1, 1, −1, −1, −1, −1, −1, 0, 1, −1, −1, −1, −1, 1, 1, −1, −1, −1, −1, −1, 1, −1, −1, −1, 1, 1, 1, −1, 1, 1, −1, 1, 1, 1).

15. A wireless device configured for high-efficiency Wi-Fi (HEW) communication, the device comprising physical layer (PHY) and medium-access control layer (MAC) circuitry configured to:
  configure an HEW frame to include an HEW long-training field (HEW-LTF), the HEW-LTF to include an HEW long-training sequence (HEW-LTS) that is orthogonal on a block-by-block basis to a legacy LTS (L-LTS); and
  transmit the HEW frame as part of a data unit for reception by one or more HEW devices.

16. The wireless device of claim 15 wherein the HEW-LTS comprises a plurality of blocks, each block being orthogonal with a corresponding block of the L-LTS.

17. The wireless device of claim 16 further comprising processing circuitry to determine a packet classification from the HEW-LTF by determining which of a plurality of HEW long-training sequences (LTSs) are included in the HEW-LTF.

18. A method for packet classification performed by a high-efficiency Wi-Fi (HEW) device, the method comprising:
  receiving an HEW frame from an HEW master station, the HEW frame including an HEW long-training field (LTF) and an HEW signal field (HEW-SIG) following the HEW-LTF;
  determining a packet classification from the HEW-LTF by determining which of a plurality of HEW long-training sequences (LTSs) are included in the HEW-LTF; and
  performing an operation based on the determined packet classification,
  wherein the HEW-LTS comprises a plurality of blocks, each block being orthogonal with a corresponding block of a legacy LTS (L-LTS).

19. The method of claim 18 wherein in response to determining the packet classification, the method includes:
  refraining from decoding the HEW SIG when the packet classification indicates that the packet is not intended for the HEW station; and
  decoding the HEW SIG when the packet classification indicates that the packet is intended for the HEW station.

20. The method of claim 18 further comprising performing a separate correlation for each HEW-LTS to identify the particular HEW-LTS that is included in the HEW frame prior to determining the packet classification.

21. The method of claim 20 further comprising accessing a look-up table based on the identified HEW-LTS to determine the packet classification.

22. A method comprising transmitting a long training sequence (LTS) for high-efficiency Wi-Fi (HEW) communications comprising one of the following sequences:

HEW-1: (1, 1, −1, −1, 1, −1, 1, 1, 1, 1, 1, 1, −1, −1, 1, 1, −1, −1, 1, 1, 1, 1, −1, −1, 1, 1, 1, 1, 0, −1, 1, −1, −1, −1, −1, 1, −1, 1, −1, 1, −1, −1, 1, 1, 1, −1, −1, 1, 1, 1, 1, 1, 1, −1, −1, 1, −1);

HEW-2: (−1, 1, −1, −1, 1, 1, −1, 1, 1, 1, −1, 1, 1, −1, 1, 1, 1, 1, 1, 1, −1, 1, −1, −1, 1, −1, −1, 1, 0, 1, 1, −1, 1, 1, −1, −1, −1, 1, 1, 1, 1, −1, −1, −1, −1, 1, 1, 1, −1, −1, −1, 1, 1, −1, 1, −1, 1)

HEW-3: (−1, −1, −1, 1, −1, 1, 1, −1, 1, −1, −1, 1, −1, −1, −1, 1, −1, −1, −1, −1, −1, −1, 1, −1, 1, −1, 1, 0, 1, −1, 1, 1, 1, 1, 1, −1, −1, 1, 1, 1, −1, −1, −1, 1, −1, −1, 1, 1, 1, 1, 1, −1, −1, 1, −1, 1)

HEW-4: (−1, −1, −1, 1, 1, 1, 1, 1, −1, −1, −1, 1, 1, 1, −1, 1, 1, −1, 1, −1, −1, −1, −1, −1, 1, −1, −1, 1, 0, 1, −1, 1, 1, −1, 1, −1, −1, 1, −1, −1, 1, 1, −1, −1, 1, 1, 1, 1, 1, −1, −1, 1, −1, −1, −1, 1, −1);

HEW-5: (1, −1, −1, −1, −1, 1, −1, −1, −1, −1, 1, 1, −1, 1, 1, −1, 1, −1, 1, −1, 1, −1, −1, 1, −1, 1, 1, 1, 0, 1, 1, 1, −1, 1, −1, −1, −1, 1, 1, 1, −1, −1, −1, −1, −1, 1, −1, 1, 1, 1, −1, −1, 1, 1, −1, 1, 1); and HEW-6: (−1, −1, −1, 1, 1, 1, 1, −1, 1, −1, −1, −1, 1, 1, −1, −1, 1, 1, −1, 1, −1, −1, 1, −1, −1, −1, −1, −1, 0, 1, −1, −1, −1, −1, 1, 1, −1, −1, −1, −1, −1, 1, −1, −1, −1, −1, 1, 1, 1, −1, 1, 1, −1, 1, −1, 1, 1, 1).

23. The method of claim 22 wherein each HEW-LTS comprises a plurality of blocks, each block being orthogonal with a corresponding block of a legacy LTS (L-LTS), and wherein the L-LTS comprises the following sequence: (1, 1, 1, 1, −1, −1, 1, 1, −1, 1, −1, 1, 1, 1, 1, 1, 1, −1, −1, 1, 1, −1, 1, −1, 1, 1, 1, 1, 0, 1, −1, −1, 1, 1, −1, 1, −1, 1, −1, −1, −1, −1, −1, 1, 1, −1, −1, 1, −1, 1, −1, 1, 1, 1, 1, −1, −1).

24. The method of claim 23 further comprising refraining from transmitting the L-LTS.

25. A non-transitory computer-readable storage medium that stores instructions for execution by one or more processors to perform operations for communication in a high-efficiency Wi-Fi (HEW) network, the operations comprising:

configuring an HEW frame to include an HEW long-training field (HEW-LTF), the HEW-LTF to include an HEW long-training sequence (HEW-LTS) that is orthogonal on a block-by-block basis to a legacy LTS (L-LTS); and transmitting the HEW frame as part of a data unit for reception by one or more HEW devices.

26. The non-transitory computer-readable storage medium of claim 25 wherein the HEW-LTS comprises a plurality of blocks, each block being orthogonal with a corresponding block of the L-LTS.

* * * * *

UNITED STATES PATENT AND TRADEMARK OFFICE
CERTIFICATE OF CORRECTION

PATENT NO. : 9,930,659 B2
APPLICATION NO. : 15/023163
DATED : March 27, 2018
INVENTOR(S) : Azizi et al.

Page 1 of 1

It is certified that error appears in the above-identified patent and that said Letters Patent is hereby corrected as shown below:

In the Claims

In Column 14, Line 12, in Claim 14, after "-1)", insert --;--

In Column 15, Line 23, in Claim 22, after "-1)", insert --;--

Signed and Sealed this
Fourth Day of June, 2019

Andrei Iancu
*Director of the United States Patent and Trademark Office*